United States Patent [19]
Kopp

[11] Patent Number: 5,762,319
[45] Date of Patent: Jun. 9, 1998

[54] DEVICE ACTING AS A VALVE INSERT

[76] Inventor: Volker Kopp, Säntisstrasse 29, CH-8133 Esslingen, Switzerland

[21] Appl. No.: 616,975

[22] Filed: Nov. 29, 1995

[30] Foreign Application Priority Data

Jul. 28, 1994 [DE] Germany .................. 44 26 730.4

[51] Int. Cl.⁶ .................................................. F16L 37/28
[52] U.S. Cl. .................................... 251/149.6; 251/366
[58] Field of Search ........................ 251/149.6, 149.1, 251/149.2, 149.7, 366

[56] References Cited

U.S. PATENT DOCUMENTS 3,486,730  12/1969  Potash ............................. 251/149.7
5,577,706  11/1996  King ................................ 251/149.6

FOREIGN PATENT DOCUMENTS 44 12 282  10/1995  Germany .
44 26 730  2/1996  Germany .
676 354  1/1991  Switzerland .

Primary Examiner—Kevin Lee

[57] ABSTRACT

A valve insert for a pressurized fluid container has a valve plate deep drawn from sheet metal, a valve body with a central tube that is molded around partial regions of the valve plate, a valve piston guided in the valve body and a valve spring attached to the valve body and acting on the valve piston. The valve plate has one end region with a bell-shaped edge shoulder connected to a flanged edge of the container, another end region with a flanged edge anchored to the central tube of the valve body and a middle region with a beading with a pitch running at least partially around it.

11 Claims, 3 Drawing Sheets

5,762,319

DEVICE ACTING AS A VALVE INSERT

BACKGROUND OF THE INVENTION

1. Field of the Invention

The invention relates to a device acting as a valve insert for a pressurized fluid container.

2. Related Prior Art

Such devices are known, for example, from Swiss Patent 676,354. They can be used together with nozzles as described, for example, in German Patent P 43 13 319, or together with mounting foam guns, as described in German Patent Application P 44 12 282. At least the valve inserts are mass-produced products. It is well known that in the case of mass produced articles it is difficult to effect advances in one field without having at the same time to take into account detriments in other fields.

It is disadvantageous in the known valves that, in addition to the valve body made of plastic, a further correctly shaped ring has to be fitted onto the bell-shaped edge shoulder and onto the pressure can. This ring is, at least in some regions, a precision part, and is correspondingly costly to produce. This ring is used in at least the same volume as the valve body. During disposal, not only the valve body, but also this ring, are lost. It has to be carefully fitted, locked frictionally and/or by configuration, to the can and to the bell-shaped edge shoulder, since it carries the thread for the nozzle or spray gun to be adjoined. The attachment must be convenient, since a can to be used in this connection, whether it is an activator can, a foam can, a cleaning agent can, a mounting foam can, or the like, is a structure about 25 cm long and can effect a considerable lever action, which is in the direction of snapping off around the geometric longitudinal axis of the valve. Furthermore, considerable rotational forces also have to be taken up if the can is screwed to, or unscrewed from, the mounting foam gun. During unscrewing, still greater torques frequently have to be overcome, since it can happen that the thread flights of the external thread and of the internal thread are stuck together. A relevant concern is that work in connection with the mounting foam field (building construction) assumes a rough environment.

SUMMARY OF THE INVENTION

The object of the invention is to make the threaded ring which has heretofore been used superfluous.

According to the invention, this object features the following:

A device acting as a valve insert for a pressurized fluid container. The valve insert has a valve plate that is deep drawn from sheet metal; a valve body with a central tube that is injection molded around partial regions of the valve plate; a valve piston that is guided in the valve body; and a valve spring attached to the valve body and acting on the valve piston. The valve plate has one end region with a bell-shaped edge shoulder that is arranged to be connected to a flanged edge of the fluid container and another end with a flanged edge that is anchored in the central tube of the valve body and has a middle region with at least one round beading running at least partially around it. The beading has a rise similar to a thread, has one to three revolutions and one to three thread starts. Of course, the valve adapter at present has to match the gun, the nozzle, the cleaning material tube, or the like to this thread-like beading. However, this is not a problem, in that the guns are in fact articles which are repeatedly used, which is not the case for the pressure cans.

DESCRIPTION OF THE DRAWINGS

Preferred forms of embodiment of the invention will now be described, with reference to the drawings, in which:

FIG. 5 is on a scale of 5:1, relative to FIGS. 1-4.

DETAILED DESCRIPTION OF PREFERRED EMBODIMENTS

Figure 1:
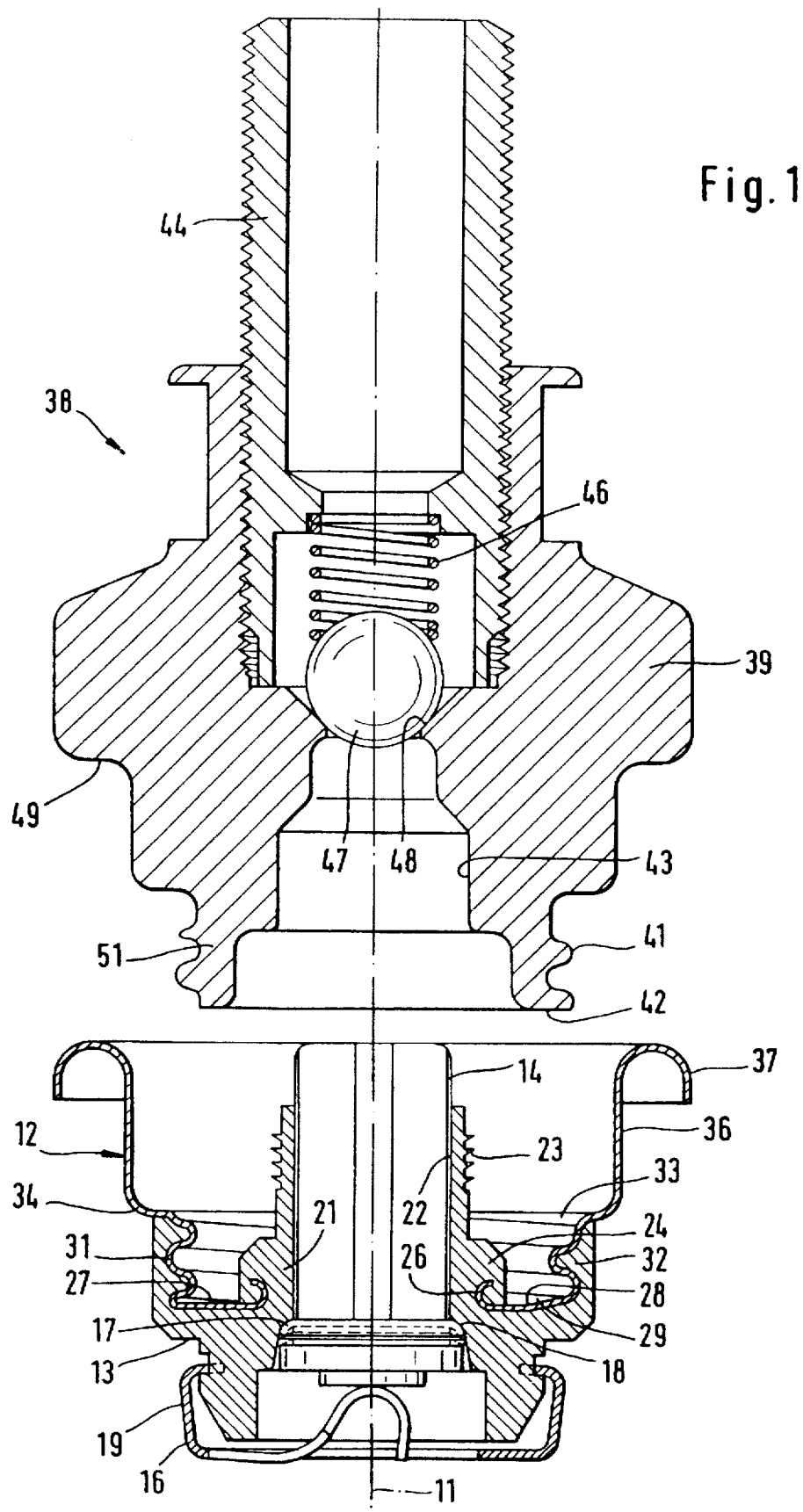
FIG. 1 shows a radial section through a valve adapter, and a valve, respectively without a gun or can.
Figure 2:
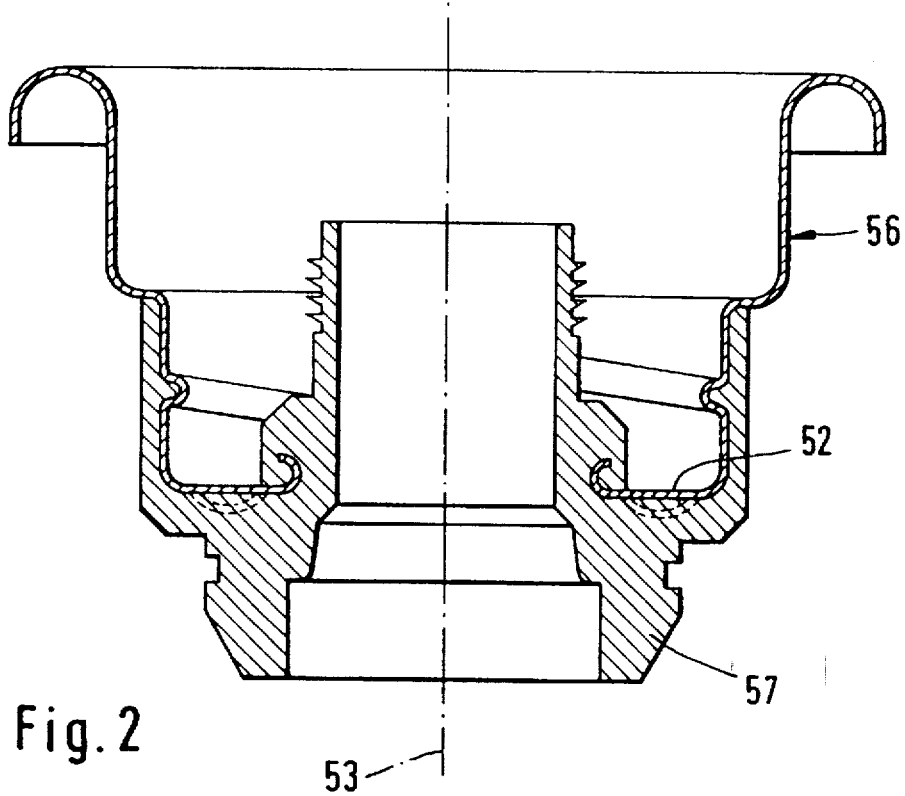
FIG. 2 shows a section through a second embodiment analogous to the section through the valve of FIG. 1, but without piston and valve spring.

A valve plate 12 is provided coaxially of a geometric longitudinal axis 11, and a valve body 13 is injection molded partially around it and guides a piston 14, which can move along the geometric longitudinal axis 11. A valve spring 16 presses upwards on the underside of the piston 14, so that sealing lips 17 are pressed fluid-tightly into a valve seat 18. Support shanks 19 of the valve spring 16 are clipped to the lower portion of the valve body 13, in the manner of a yoke spring.

The valve body 13 has a central tube 21 whose inner continuous bore 22 guides the piston 14 with little play. The upper region of the central tube 21 bears external sealing lips, which run completely around it and the plurality that forms a sealing labyrinth. The central tube 21 has in the lower region a substantial thickening 24 into which a flanged edge 26 of the valve plate 12 engages. The said flanged edge 26 is coaxial to the geometric longitudinal axis 11 and is open at the edge in the manner of a claw. An annular floor region 27 adjoins the flanged edge 26 in the radially outward direction, and is shaped with a fold only where the end of a screw thread or beading 29 runs out. The annular floor region 27 adjoins the flanged edge 26 in the radially outward direction, and is shaped with a fold only where the end of a screw thread 29 runs out. The annular floor region 27 is otherwise situated radially of the geometric longitudinal axis 11. The end of the screw thread or beading 29, seen from below, is the beginning of a thread 31 in the middle region of the valve plate 12, which is somewhat less than single flight, is a round thread, and—as can be gathered from the scale drawings—is a coarse thread. The outer surface of the thread 31 results in a large holding surface of this wall region 32 of the valve body 13 on the metal of the valve plate 12 and represents, to a considerable extent, a positive securement against the pulling of the valve plate 12 upwards out of the valve body 13. Moreover, since the thread 31 has a pitch and is not just rotationally symmetrical with respect to the geometric longitudinal axis 11, there also results a securement against rotation of the valve plate 12 relative to the valve body 13.

An upper end 33 of the thread flight ends in around knee 34, which projects out over the valve body 13, so that the flanged edge of the pressure can (not fully shown) never makes contact with the valve body 13.

After the knee 34, the valve plate 12 merges into a comparatively long tubular region 36, which is rotationally symmetrical with respect to the geometric longitudinal axis 11, and which merges at the top into a bell edge 37, which is open at the bottom. In the mounted state, the bell edge 37 receives the flanged edge of the pressure can fluid-tightly.

An adapter 38 for a gun (not shown) has an adapter body 39, which has at the bottom an external thread 41, which is complementary to the thread 31. Thread 31 is an internal thread. The external thread 41 has at the bottom an end surface 42, which when screwed together is seated on, and presses against, the annular floor region 27. The sealing lips 23 then lie tightly against the step bore wall 43 of the adapter 38. A further continuous tube 44 is provided in the adapter body 39 and supports a compression coil spring 46, which presses a valve ball 47 fluid-tightly into its seat 48. In the mounted state, the projecting annular surface 49 can contact the bell shape edge 37. The space between the thickening 24 and the thread 31 is of a size such that the external thread 41 together with the base material 51 of the thread are in fact guided there, but fit in substantially without resistance.

Figure 3:
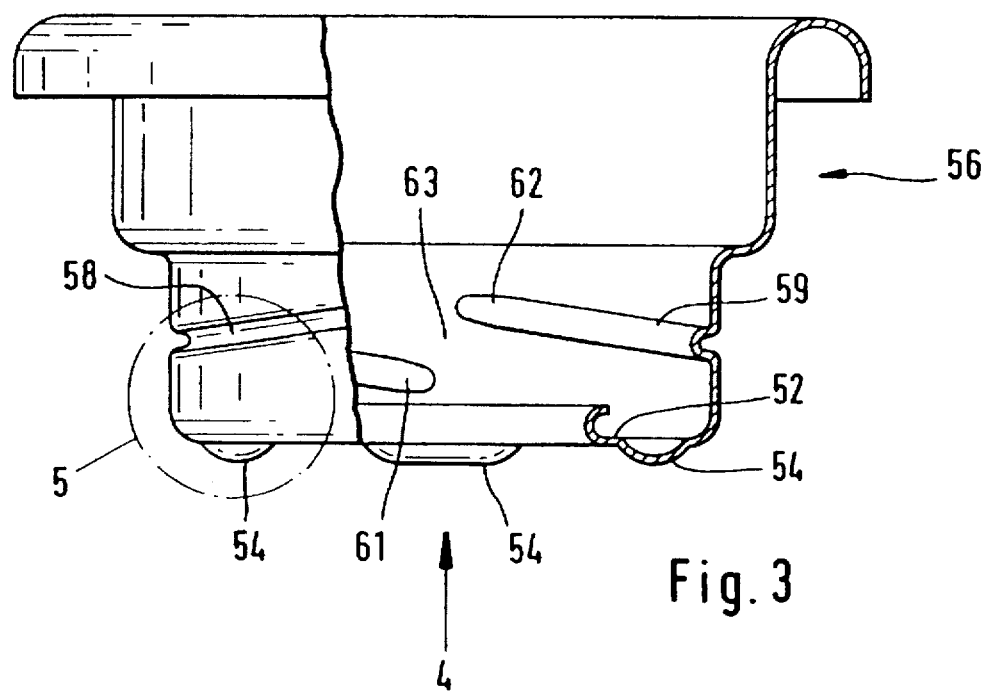
FIG. 3 shows a view similar to that of FIG. 2, but only of the valve plate, partially broken away and partially cut away.
Figure 4:
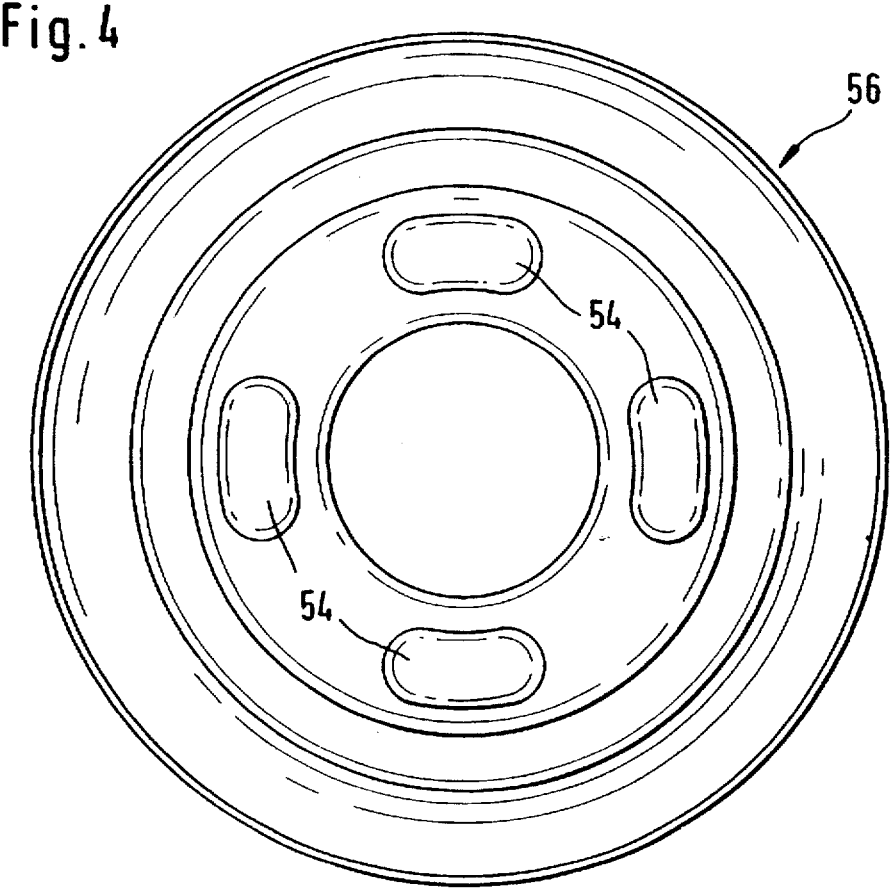
FIG. 4 shows a view according to the arrow 4 in FIG. 3.

The second embodiment according to the following Figures is substantially equivalent to the first embodiment. However, the second embodiment is preferred from the manufacturing standpoint. Its annular floor region 52 has no fold 28, as in the first embodiment. The floor region 52 is flat throughout and substantially perpendicular to the geometric longitudinal axis 53. Four dimples 54 stand out from the annular floor region 52. The four dimples 54 represent a rotational securement for the valve plate 56 relative to the valve body 57. The principal difference between the first and second embodiment is that the thread is represented solely by thread sectors 58, 59. These thread sectors act like a continuous thread, but do not merge into each other. The thread sectors 58, 59 leave unshaped zones 63 in their end regions 61, 62. The unshaped zones 63 have not been rolled, and can transmit tensile forces between the thread sectors 58, 59 and the annular floor region 52 better than the thread 31 in the first embodiment. The end regions 61, 62 run out, according to FIG. 3, like tongues, without sharp transitions. The thread sectors 58, 59 are already intrinsically easier to roll than the wider thread 31, since less material has to be deformed. It is rolled from the outside inwards, which is easier to effect than if the thread sectors 58, 59 were to be rolled from the inside outwards.

Figure 5:
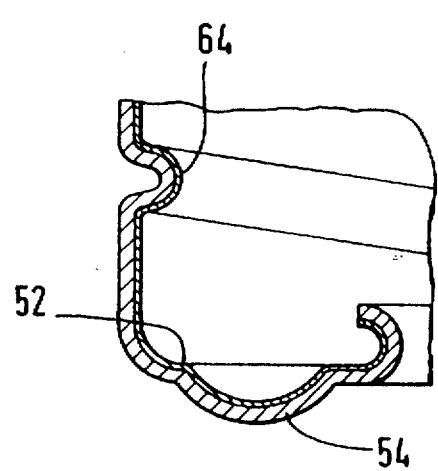
FIG. 5 shows an enlarged view of the region 5 in FIG. 4 cut radially.

According to FIG. 5, the valve plate 56 has a coating 64. The coating 64 is in the range of tenths of a millimeter thick and can, for example be a lacquer, which substantially prevents a thread complementary to the thread sectors 58, 59 from adhering too strongly to a further adapter body (not shown) after its external thread has been screwed in. This external thread can be a continuous thread, as in the first embodiment. In the second embodiment, the thread is a double start thread.

I claim:

1. A device acting as a valve insert for a pressurized fluid container means, comprising:

a valve plate that is deep drawn from sheet metal, a valve body with a central tube that is molded around partial regions of said valve plate, a valve piston that is guided in said valve body, and a valve spring attached to said valve body and acting on said valve piston, said valve plate having one end region with a bell-shaped edge shoulder that is arranged to be connected to a fluid container means and another end with a flanged edge that is anchored in said central tube of said valve body and has a middle region with at least one beading running at least partially around said valve plate, said beading having a pitch.

2. A device according to claim 1, wherein said beading comprises a continuous thread flight from a thread start to a thread end.

3. A device according to claim 1, wherein said beading comprises a plurality of thread sectors.

4. A device according to claim 1, wherein said beading has a coarse thread pitch.

5. A device according to claim 1, wherein said beading comprises a round thread.

6. A device according to claim 1, wherein said beading has 1 to 3 revolutions.

7. A device according to claim 6, wherein said beading has 1.3 to 2.5 revolutions.

8. A device according to claim 1, wherein said container means has a thread complementary to said beading, and said valve plate has an annular floor region provided radially outside said flanged edge of said container means, that forms, as regards diameter, an opposing pressing surface for an end face of said complementary thread.

9. A device according to claim 1, wherein the valve plate has an anti-adhesive coating on its inner side.

10. A device according to claim 8, wherein said annular floor region has outwardly projecting dimples.

11. A device according to claim 1, wherein said beading comprises essentially a one-start to a three-start thread.

* * * * *